June 17, 1930.  D. G. COOPER  1,763,640
VALVE OPERATING MECHANISM
Filed June 4, 1928  3 Sheets-Sheet 2
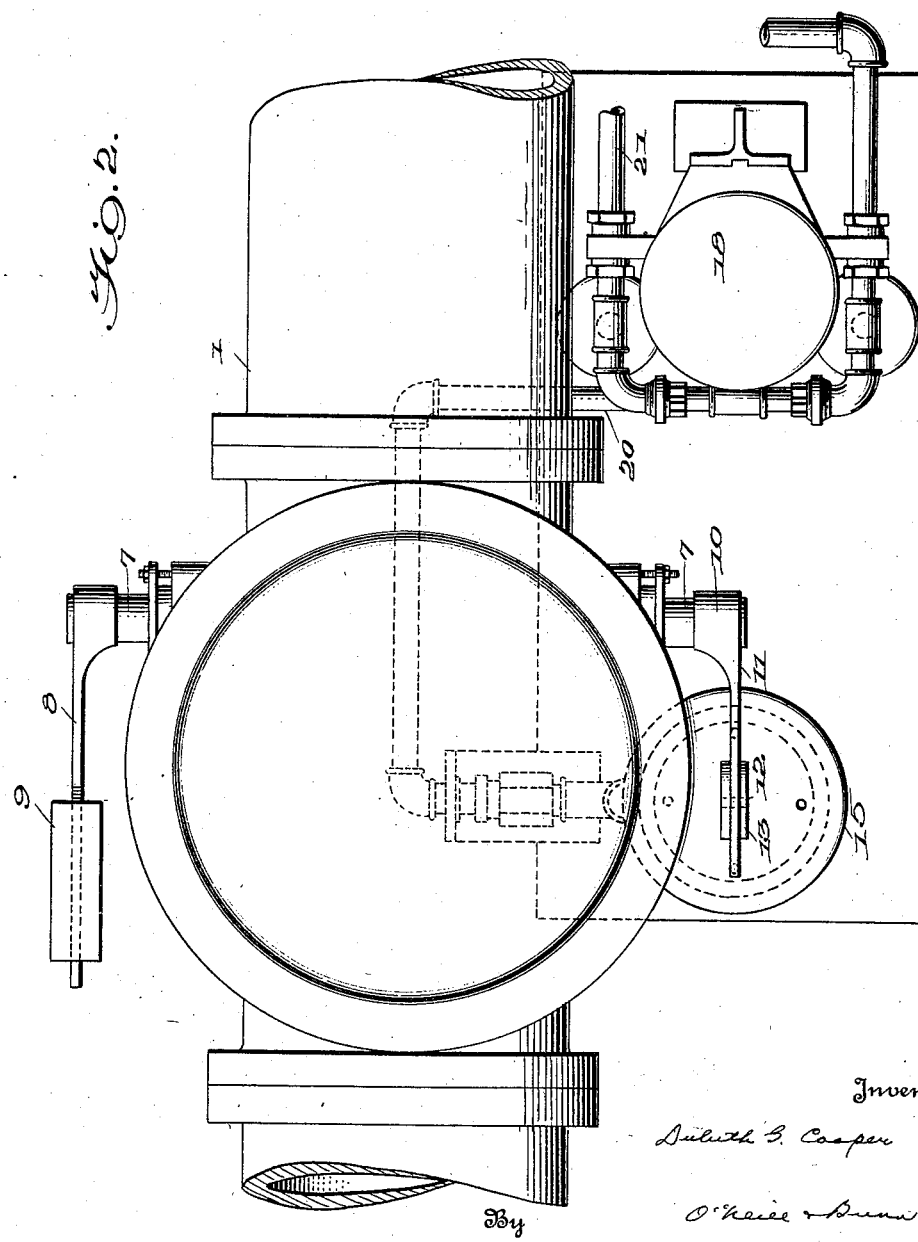

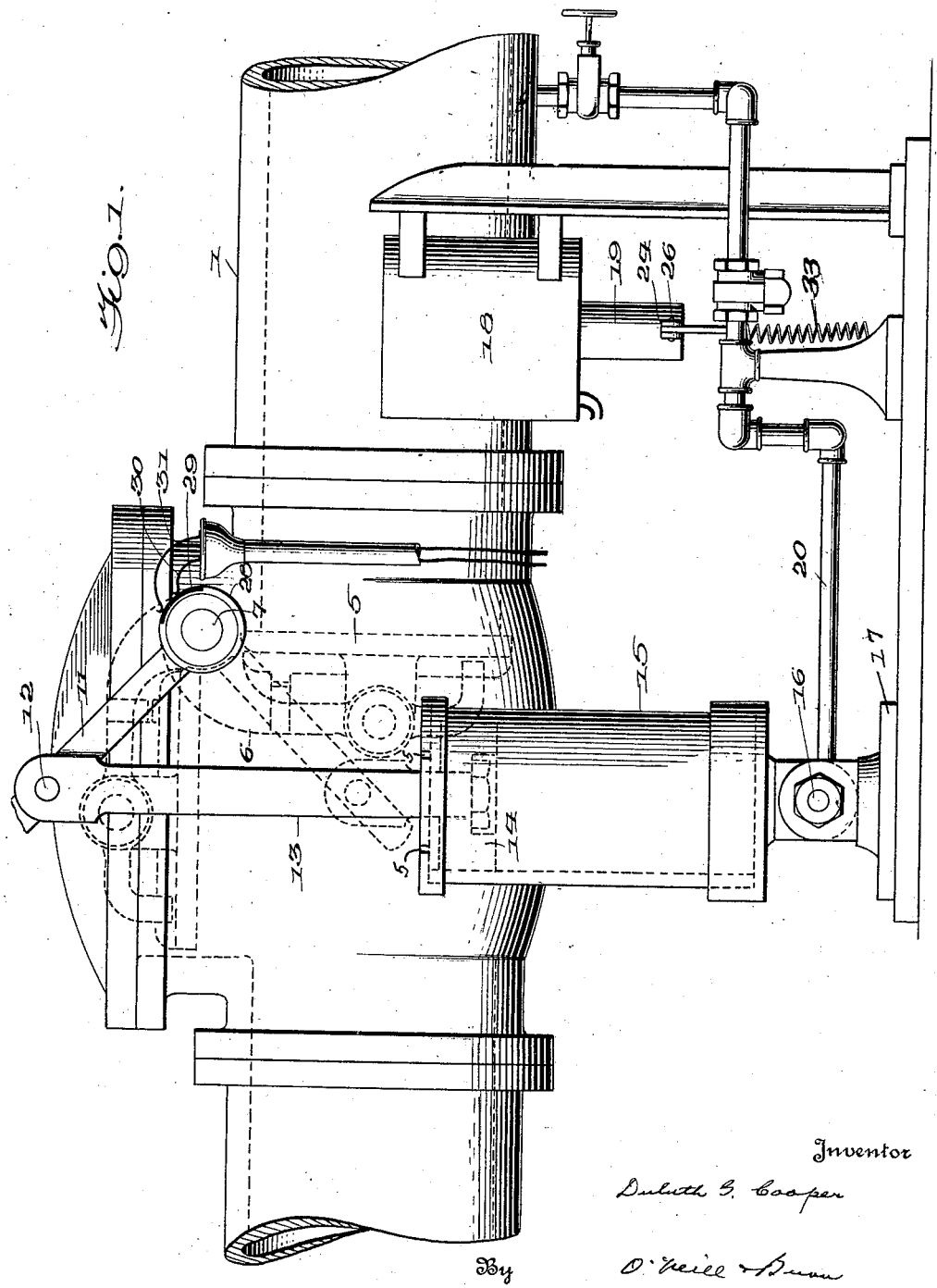

June 17, 1930.  D. G. COOPER  1,763,640
VALVE OPERATING MECHANISM
Filed June 4, 1928  3 Sheets-Sheet 3
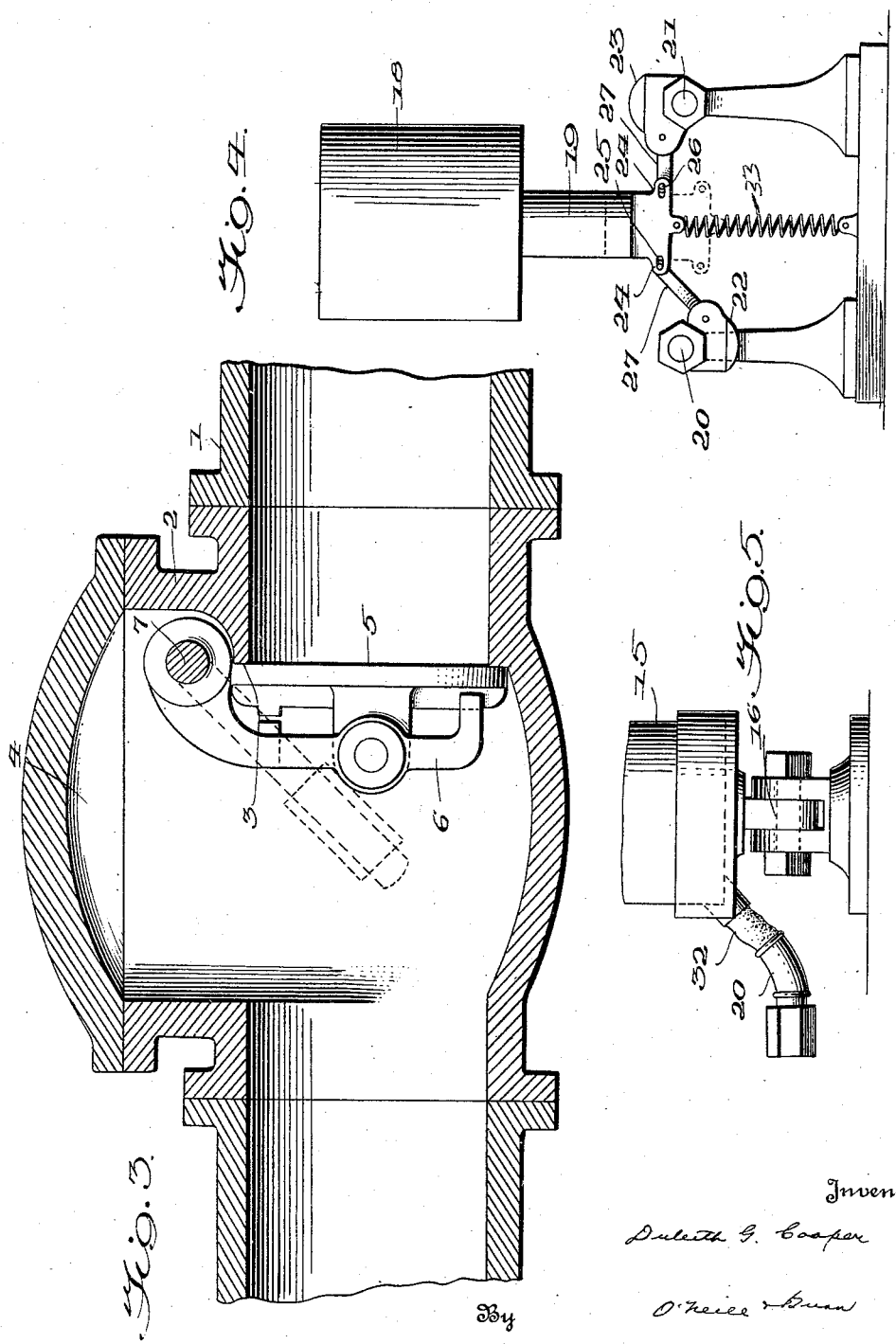

Patented June 17, 1930

1,763,640

UNITED STATES PATENT OFFICE

DULUTH G. COOPER, OF HONOLULU, TERRITORY OF HAWAII

VALVE-OPERATING MECHANISM

Application filed June 4, 1928. Serial No. 282,637.

This invention relates to valve controlling mechanism, and more particularly to means for positively retaining valve elements in open position, whereby to eliminate the necessity of the weight of the valve body being supported by pressure lost in the conduit controlled by said valve.

The ordinary check valve is in the form of a disk which is pivotally secured at its upper portion so as to be forced to open position by the pressure in the conduit, the weight of the valve element tending at all times to cause it to gravitate to closed position. The element therefore being dependent, for its operative position, upon the difference in pressure in the conduit on either side of the valve element, it necessarily follows that the support of said valve element necessitates a higher pressure in the conduit on the inlet side of the valve than is required to be actually maintained on the outlet side of the valve. Increased protection against the reverse flow through the conduit requires increased weight of the element proper, or the addition of weights to a shaft and arm secured to the valve element to secure prompt closing, thereby obviously increasing the amount of power necessary to support the element, and requiring additional head or pressure at the inlet side of the valve. The amount of power required increases directly as the head or pressure increases, provided of course the quantity of air, water, or gas, flowing through the conduit, remains constant. Units already in service, operating under the above conditions, cannot increase their output without encountering increased losses with the same protection nor can they increase their protection against reverse flow of substance without encountering losses. The greater the increased output or protection, the greater the power loss. With this type of valve, by counter-weighting the valve element to reduce head or pressure, the protection against reverse flow is reduced. With the head or pressure through the valve reduced to an absolute minimum, it will be necessary for the substance to reverse its flow and attain a considerable velocity in the opposite direction before the element can operate. If the element is not in proper working condition, it is possible for the substance to attain such a high velocity that, to stop it suddenly, would tend to rupture the equipment under pressure.

The primary object of the invention therefore, is the provision of means adapted to automatically assume the weight of the valve element after it has been initially moved by the head or pressure in the conduit and eliminate the pressure loss thru the valve thereby securing greater output with the same power or the same output with less power.

Other objects of the invention will be made apparent in the following specifications, when read in connection with the drawings forming a part thereof.

In said drawings:

Fig. 1 is a side elevation of a section of a conduit equipped with a structure embodying my invention, the valve element being indicated in dotted lines.

Fig. 2 is a top plan view of the structure shown in Fig. 1, the valve element not being illustrated.

Fig. 3 is a section taken vertically through the conduit, the valve element being shown in full lines.

Fig. 4 is a side elevation illustrating an electro-magnet structure included in the means for controlling the valve, and, Fig. 5 is a side elevation of the lower section of a pivotally mounted cylinder, included in my invention.

Now referring specifically to the drawings, in which like reference numerals indicate like parts throughout the several views, 1 indicates a conduit adapted for the transportation of air, water, gas, or any other fluent commodity under pressure from a source, not shown. The conduit is provided with an enlarged portion 2, beneath which is a valve seat 3, and with an enlarged chamber 4. A valve element 5, here shown as a disk, is adapted to the seat 3, and is connected to a supporting arm 6, provided with a collar secured to a rotative shaft 7 extending transversely through the chamber 4, the structure described being best shown in Fig. 3.

As illustrated in Fig. 2, it will be noted that the shaft 7 extends entirely through the chamber 4, and is provided at one end with an arm 8, carrying a slidable weight 9 thereon. The other end of the shaft 7 is surrounded by a collar 10, carrying an arm 11, pivotally secured at 12, to a piston rod 13, (here shown as a flat bar) operatively secured to a piston 14, mounted in a cylinder 15. The cylinder 15 is pivotally secured at 16, to a base 17, whereby to permit swinging action when necessary, as will be hereinafter more fully referred to.

Mounted adjacent the conduit 1, is an electro-magnet 18, operatively connected to an electric source, (not shown) and provided with a core 19, here shown as projecting downwardly between pipes 20, 21, carrying fluid under pressure, and provided, respectively, with valves 22 and 23. On each side of the lower end of the core 19, is an ear 24, 24, carrying a laterally-elongated slot 25, adapted to slidingly receive a pivot pin 26, carried by a lever 27, one of said levers being operatively connected to each valve 22 or 23.

As illustrated in Fig. 1, a collar 28 surrounds the point of pivotal connection of the arm 6 to the shaft 7, and a sector of conducting material 29 is secured to said collar, and adapted for engagement by spring contacts 30, 31, in circuit with the electric-magnet. In the opeartion of the device pressure is built up in the conduit 1 sufficient to lift the valve element 5 from its lower position shown in Figs. 1 and 3, to a raised position such that the sector 29 will be brought in engagement with the contacts 30, 31, it being noted that, merely for the sake of clarity, the dotted lines at the left show the position of the sector when the valve 5 is closed, and the full lines indicate the sector with the valve in its extreme upper position. As soon as the movement of the collar 28 completes the electrical circuit, the core 19 moves upwardly, opening valve 22, leading to the cylinder through pipe 20, and closing valve 23. Such movement of the valve 22 permits fluid under pressure to pass into the lower portion of the cylinder 15, forcing piston 14 upwardly therein, and, because of the pivotal connection of the arm 11 to the piston rod or bar 13, the valve 5 will be raised into the housing 4, out of the path of the current flowing through the conduit 1, as indicated in dotted lines at the top of Fig. 1. In the vertical movements of the valve 5, the cylinder 15 swings on its pivot 16, a flexible joint 32, being provided to permit such movement.

In view of the foregoing it will be obvious that, as long as the valve 22 is open, and pressure maintained in the pipe 20, the valve 5 will be positively held in its uppermost position shown in Fig. 1, out of the path of the current in the conduit 1, and imposing no load thereupon. To vent the cylinder 15 and to guard against a balanced pressure therein because of possible slow leakage past the sides of the piston, the upper end of the cylinder is provided with a sufficient number of minute apertures, preventing the building up of pressure above the piston, as will be understood, and thereby insuring that the valve 5 will always be retained in the housing 4. Under normal conditions, however the top of the piston 14 will be covered with a packing gasket which will normally close the apertures in the top of the cylinder, and there will be no space between the top of the piston and that of the cylinder.

As long as electric current is supplied to the electro-magnet 18, the valve 22 is held in open position, and the valve 5 in its uppermost position, thereby requiring no additional valve supporting power from the unit which is maintaining the pressure in the conduit 1, and only a very small magnetizing current from the electric source. When the current to electro-magnet 18 is cut off, the core 19 is pulled downwardly by the spring 33, closing valve 22, and opening valve 23, the pressure in the cylinder 15 being released, the compressed fluid therein passing through the pipe 21 to a sump, or to the atmosphere. Such action permits the valve 5 to assume the closed position shown in Fig. 3, thereby eliminating a reverse flow in the conduit.

It will be noted that, after initial movement of the valve 5 to a position such that the sector 29 engages the contacts 30, 31, the weight of the valve is never thereafter imposed upon the current traversing the conduit 1, since the valve is positioned and supported entirely out of the path of travel of said current. By properly positioning the weight 9 on the arm 8, with respect to the area of the cylinder 15 and piston 14 and the weight of the valve 5, the latter may be adjusted to close automatically at any predetermined speed of the operating fluid, or when the pressure in the conduit 1 is reduced to any predetermined degree.

It will be observed that the force of the current in the conduit 1 serves to initially move the valve 5 from its seat 3 and to swing it to the point where the section 29 and the contacts 30, 31 are operative, after which the valve 5 is positively moved into the chamber 4 and held entirely out of the path of the current passing through the conduit 1 by pressure applied in cylinder 15.

Modifications of the structure herein disclosed may be suggested to those skilled in the art, but my invention covers all embodiments falling fairly within the scope of the appended claims, covering primarily the bearing of the weight of the valve by a piston, actuated by the liquid or gas being conveyed in the conduit, either through electrical means as described or by variations such as independent solenoid operated valves 22 and 23, or by mechanical means such as levers and rods operating valves 22 and 23 from weight lever 8 or other moving parts.

I claim:—

1. A current conveying conduit, a valve mounted in said conduit and adapted for swinging movement therein, and electrically-operated means, actuated upon movement of the valve, to a certain degree, adapted to positively move said valve to a position out of the path of the current.

2. A current conveying conduit, a valve mounted in said conduit and adapted for swinging movement therein, and electrically-operated means, actuated upon movement of the valve, to a certain degree, adapted to positively move and retain said valve to a position out of the path of the current.

3. The combination with a current conveying conduit having a laterally disposed chamber, of a rotative shaft extending through said chamber and projecting at each end, an arm having a collar surrounding said shaft within said chamber, a check valve carried by said arm and adapted for movement to a position closing said conduit, or into said chamber out of the line of current flow, and means for rotating said shaft to shift said valve, said means comprising a cylinder having a piston connected to said valve, an electro-magnet controlling the pressure within said cylinder, and a sector of conducting material carried by said arm adapted to be brought into engagement with contacts in circuit with said electro-magnet.

4. A current conveying conduit provided with a valve mounted for swinging movement therein, a pressure cylinder having its piston connected to said valve, an electro-magnet adapted to control the pressure in said cylinder, and a curved electrical contact carried by the valve and wired to said electro-magnet, and adapted to make and break the electric circuit during the movement of the valve in said conduit.

5. A current conveying conduit having a valve mounted for swinging movement under the power of the current flow, fluid-pressure devices connected to said valve and adapted to cause a further swinging movement thereof after a predetermined initial movement thereof under the force of the current, and means for controlling the operation of said fluid pressure devices.

6. A current conveying conduit having a valve mounted for swinging movement under the power of the current flow, fluid-pressure devices connected to said valve and adapted to cause a further swinging movement thereof after a predetermined initial movement thereof under the force of the current, and means for electrically controlling the operation of said fluid pressure devices.

In testimony whereof I affix my signature.

DULUTH G. COOPER.